United States Patent [19]
Reinsma et al.

[11] 3,822,100
[45] July 2, 1974

[54] JOINT FOR A SPHERICAL BEARING

[75] Inventors: Harold L. Reinsma, Dunlap; Eldon D. Oestmann, Washington, both of Ill.

[73] Assignee: Catepillar Tractor Co., Peoria, Ill.

[22] Filed: Feb. 16, 1973

[21] Appl. No.: 333,274

[52] U.S. Cl. .............................................. 403/134
[51] Int. Cl. ........................................... F16c 11/06
[58] Field of Search ............. 403/134, 131, 132, 75, 403/76, 79, 158, 90, 113, 114, 121, 122, 125, 141, 143, 335, 336, 140, 142

[56] References Cited
UNITED STATES PATENTS

| | | | |
|---|---|---|---|
| 2,932,534 | 4/1960 | Williams | 403/140 |
| 2,974,986 | 3/1961 | Hazard | 403/76 |
| 3,086,801 | 4/1963 | Herbenar | 403/141 X |
| 3,383,129 | 5/1968 | Ulderup | 403/140 X |
| 3,441,299 | 4/1967 | Pfaur | 403/131 |
| 3,695,650 | 10/1972 | Stuck | 403/140 |

*Primary Examiner*—Geo. V. Larkin
*Attorney, Agent, or Firm*—Phillips, Moore, Weissenberger, Lempio & Strabala

[57] ABSTRACT

A joint includes a shaft on which a ball is formed, and a socket body about the ball. End retainers are fixed to the shaft on either side of the socket body, and annular resilient members are positioned on either side of the socket body and in contact with the end retainers and socket body to form a sealed joint. The resilient members are held in a compressed state, and limited rotation of the socket body about any axis perpendicular to the shaft, and about the longitudinal axis of the shaft, is permitted, the deflection of such resilient members allowing such rotation.

10 Claims, 2 Drawing Figures

JOINT FOR A SPHERICAL BEARING

BACKGROUND OF THE INVENTION

This invention relates to ball and socket joints, and more particularly, to such a joint which incorporates positive seal means which allow pivoting of the ball and socket joint.

Positive sealing of ball and socket joints which are subjected to limited rotation and transverse angular motion has been a problem for many years. For the most part, industry uses face or lip-type seals which engage the outer periphery of the ball and which run over a sealing zone alternately exposed to the inner chamber and the exterior surface which is generally open to the atmosphere. (See, for example, U.S. Pat. No. 3,506,315 to Young.) Because the exterior surface of such bearings deteriorates with extended service, the positive effectiveness of the seals is impaired and dirt may enter the bearing area while lubricant escapes.

Another problem with prior art joints is that the seals often must be installed at the time of assembly of the joint. This allows possible ingestion of dirt and abrasives into the closely fitted associated bearing surfaces during sealed servicing. See, for example, U.S. Pat. No. 3,620,578 to Fix.

Another problem with conventional designs is that they may require closely machined diameters to install press-fitted seals. This adds to the overall expense of the seal arrangement. See, for example, U.S. Pat. No. 3,680,924 to Otto et al.

Another problem with prior art designs is the relative complexity and large number of separate pieces they may require.

Of more general interest in this area are U.S. Pat. No. 2,308,613 to Le Tourneau, and U.S. Pat. No. 3,666,332 to Kampert et al.

SUMMARY OF THE INVENTION

It is an object of this invention to overcome the problems of the prior art by providing a ball and socket joint which incorporates positive sealing thereof, meanwhile allowing proper rotation and operation of such joint.

It is a further object of this invention to provide a joint which, while fulfilling the above object, may be pre-assembled to an extent so as to prevent ingestion of dirt and abrasives therein during field servicing.

It is a still further object of this invention to provide a joint which, while fulfilling the above objects, is extremely simple in design and manufacture.

Broadly stated, the invention comprises a ball and socket joint comprising a shaft having oppositely extending ends. Ball means are included and comprise a ball member fixed relative to the shaft between the ends thereof and defining a substantially spherical surface portion. Further included are socket means comprising a socket body defining a substantially spherical concave surface portion adjacent the substantially spherical convex surface portion of the ball member. A first annular retainer is fixed about and relative to the shaft and in continuous annular contact with the shaft on one side of the ball member and spaced from the socket body. A second annular retainer is fixed about and relative to the shaft and in continuous annular contact with the shaft on the other side of the ball member and spaced from the socket body. A first annular resilient member is disposed between the socket body and the first retainer and in continuous annular contact with the socket body and first retainer. A second annular resilient member is disposed between the socket body and the second retainer and in continuous annular contact with the socket body and second retainer.

BRIEF DESCRIPTION OF THE DRAWINGS

These and other objects of the invention will become apparent from the following specification and drawings, in which.

DESCRIPTION OF THE PREFERRED EMBODIMENTS

Figure 1:
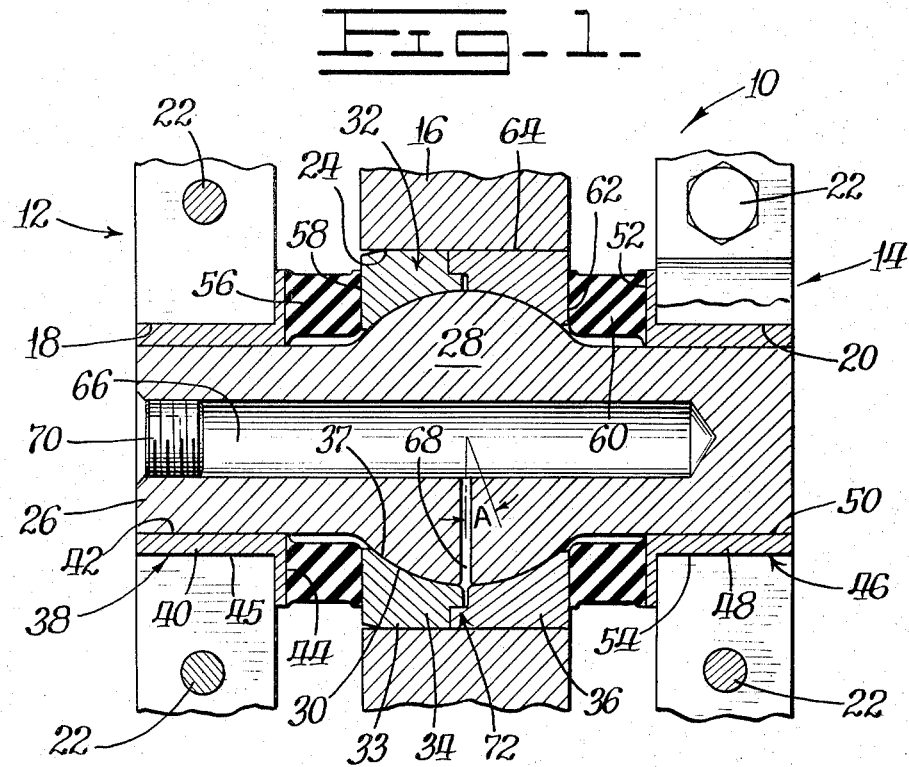
FIG. 1 is an elevational view, partially in section, of a first embodiment of the joint; and, FIG. 2 is an elevational view, partially in section, of a second embodiment of the joint.

Shown in FIG. 1 is a first embodiment of sealed cartridge joint 10. Such joint 10 is disposed between a pair of fixed, substantially parallel walls 12 and 14. The joint 10 runs between these walls 12,14, and a central arm 16 is disposed between the walls 12,14. The walls 12,14 define bores 18,20 respectively, and are preferably split diametrically of these bores 18,20, the parts being removably secured together by a plurality of bolts 22, together forming an end cap-like structure of the conventional type. Arm 16 also defines a bore 24. The sealed cartridge joint 10 is actually a ball and socket joint which includes a shaft 26 having oppositely extending ends. A ball member 28 is defined by the shaft 26 as an integral part thereof, between the ends of the shaft 26. The ball member 28 defines a substantially spherical convex surface portion 30.

Socket means 32 are disposed about the ball member 28 and are made up of a socket body 33 comprising annular socket body portions 34,36 which may be fitted together from opposite sides of the ball member 28 to define the socket body 33. The socket body 33 defines a substantially spherical concave surface portion 37 which is adjacent the spherical convex surface portion 30 of the ball member 28 when so positioned.

An annular retainer 38 includes a cylindrical portion 40 the inner bore 42 of which is an interference fit with the shaft 26, so that such retainer 38 may be fixed about and relative to the shaft 26, to be in continuous annular contact with the shaft 26. The retainer 38 also defines a retainer surface 44 which is positioned inward of the cylindrical portion 40 and which is substantially perpendicular to the longitudinal axis of the shaft 26. The external cylindrical surface 45 of the cylindrical portion 40 is a slight interference fit with the bore 18 of wall 12.

A second annular retainer 46 includes a cylindrical portion 48, the inner bore 50 of which is an interference fit with the shaft 26, so that such retainer 46 may be fixed about and relative to the shaft 26, to be in continuous annular contact with the shaft 26. The retainer 46 also defines a retainer surface 52 which is positioned inward of the cylindrical portion 48 and which is substantially perpendicular to the longitudinal axis of the shaft 26. The external cylindrical surface 54 of the cylindrical portion 48 is a slight interference fit with the bore 20 of wall 14. These retainers 38,46 are disposed on either side of the socket body 33 and ball member 28, and are spaced from the socket body 33 as shown.

An annular resilient member 56, in this embodiment of elastomeric material such as neoprene, is disposed about the shaft 26 and between the socket body 33 and the retainer 38. The retainer 38 is positioned so that resilient member 56 is in continuous annular contact with surface 44 thereof, and with the surface 58 of socket body portion 34. The annular resilient member 56 is in fact bonded to the surfaces 44 and 58.

A second annular resilient member 60, also of neoprene in this embodiment, is disposed about the shaft 26 and between socket body 33 and retainer 46. The retainer 46 is positioned so that resilient member 60 is in continuous annular contact with surface 52 and with the surface 62 of socket body portion 36. The annular resilient member 60 is bonded to the surfaces 52 and 62.

The socket body 33 includes an outer portion 64 adapted to be received in slight interference relation with the bore 24 of the central arm 16.

The shaft 26 defines a central longitudinal passage 66 and a plurality of radial passages 68 communicating therewith and adapted to distribute lubricating fluid to the surfaces 30,37. A plug 70 is removably secured in the end of the passage 66 for the purpose of adding lubricant.

Retainer 38, resilient member 58, and socket body portion 34 are preferably made up of as a sub-assembly formed by pre-bonding of the resilient member 56 to surfaces 44 and 58. Likewise, retainer 46, resilient member 60, and socket body portion 36 are preferably made up as a sub-assembly by pre-bonding of the resilient members 60 to the surfaces 52 and 62. Each sub-assembly is then urged inwardly on the shaft 26 until the resilient members thereof reach a pre-determined compressibly-loaded condition which serves to improve the fatigue life of the elastomeric members and their relationship to the bonded faces. Sufficient pre-compression, in this embodiment approximately 10 percent, is developed so that in a condition of maximum transverse oscillation and rotation of fibers of the resilient members 56,60 are not in tension. The resilient members 56,60 are further sized to maintain a relatively moderate maximum working strain. The limit of transverse angular misalignment as represented by the angle A about any axis of rotation substantially perpendicular to the longitudinal axis of the shaft 26 can be as much as 20° in either direction from the centered or neutral state of the socket body 33 determined by the position thereof with no load thereon except the compressive force of the annular resilient member 56,60. This limit of movement can be made without completely releasing the compressive force on either annular resilient member, i.e., placing either in a state of tension. Also, the range of rotation of the arm 16 and associated socket body 33 relative to the ball member 28 and the walls 12 and 14 about the longitudinal axis of the shaft 26 can be as much as 30°, likewise in either direction from such centered or neutral state defined above, without completely releasing the compressive force on either annular resilient member, i.e., placing either in a state of tension. It will also be seen that, because of the particular placement of surfaces of the retainers, resilient annular members, and socket body, in association with the shaft 26, and the proper bonding thereof, a sealed joint 10 is achieved.

During assembly of the joint 10, the retainers 38 and 46 can be welded to the shaft 26 to form a permanent cartridge joint assembly or can be secured with a slightly tight fit between the internal surfaces 42,50 and the outer periphery of the shaft 26. Also, the socket body portions 34, 36 can be aligned with the aid of a piloting connection such as shown generally by the reference numeral 72, and can be welded about their outer adjacent peripheries centrally thereof. It should be appreciated that there are a number of other ways to interconnect the socket body portions 34,36.

Figure 2:
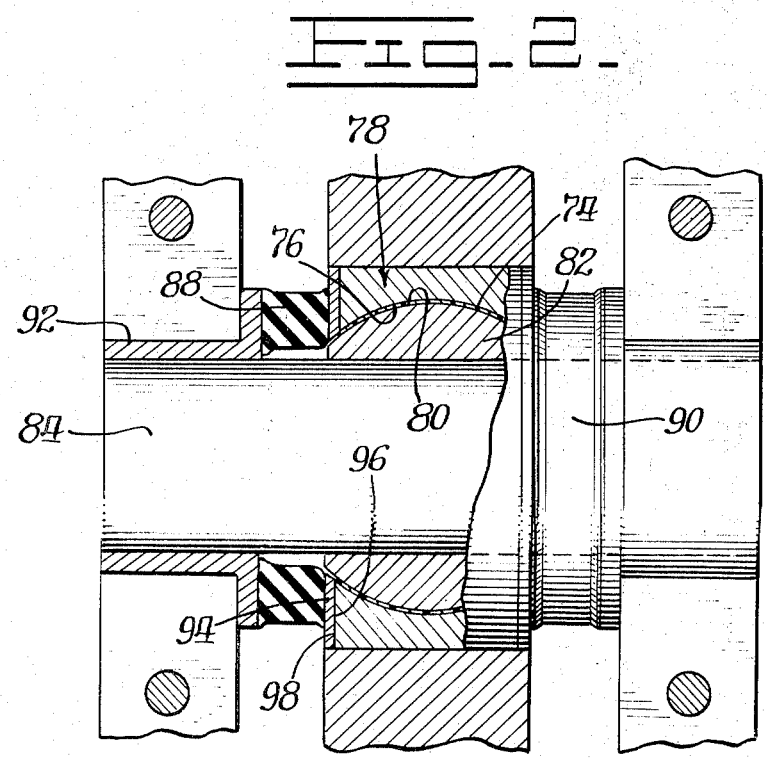

FIG. 2 represents a dry form of sealed cartridge joint requiring no internal lubrication. In this embodiment, a resin-impregnated fibrous bearing liner 74 is disposed intermediate the substantially spherical concave surface portion 76 defined by the socket body 78 and the substantially spherical convex surface portion 80 of a separate ball member 82 which is in press fit relation with a shaft 84. The bearing liner 74 which is bonded or otherwise secured to the surface 76 of the socket body 78 may be moldably formed to include various cloth and/or filament arrangements disposed therein. Such liners 74 require no lubrication because of their self-lubricating properties. Since many of these commercially available liners are relatively soft, it is imperative that all abrasives be kept away from the bearing surfaces. The annular resilient members 88 and 90 provide this function, and since no petroleum base lubricant is required for the subject alternate bearing, a natural rubber can be used for the annular resilient members 88, 90 for improved resistance to fatigue when compared to the service life of various oil-resistant elastomeric materials.

In the alternate embodiment, a sub-assembly comprising the retainer 92, the resilient member 88, and a washer 94 (considered a part of the socket body 78) is vulcanizably bonded together. A second assembly comprising the ball member 82, bearing liner 74, and socket body 78, which can be a single, integrally formed member, is then pressed onto the shaft 84. An inwardly disposed end face 96 of the washer 94 is then coated with an adhesive such as epoxy and the first sub-assembly (and particularly the retainer 92) is pressed onto the shaft 84. The resilient member 88 is axially compressed, forcing the washer 94 into intimate contact with an end face 98 of the socket body portion 78.

A sub-assembly made up of a retainer, resilient member, and a washer, similar to the sub-assembly just described and fitted to shaft 84, is then pressed onto the shaft 84 on the opposite end thereof, until resilient member 90 is likewise axially compressed.

Curing the adhesive completes the assembly of the sealed cartridge joint.

What is claimed is:

1. A ball and socket joint comprising:
a shaft having oppositely extending ends;
ball means comprising a ball member fixed relative to the shaft between the ends thereof, and defining a substantially spherical convex surface portion;
socket means comprising a socket body defining a substantially spherical concave surface portion adjacent the spherical convex surface portion of the ball member;
a first annular retainer fixed about and relative to the shaft and in continuous annular contact with the shaft on one side of the ball member and spaced from the socket body;

a second annular retainer fixed about and relative to the shaft and in continuous annular contact with the shaft on the other side of the ball member and spaced from the socket body;

a first annular resilient member disposed between the socket body and the first retainer and in continuous annular contact with the socket body and first annular retainer; and a second annular resilient member disposed between the socket body and the second retainer and in continuous annular contact with the socket body and second annular retainer.

2. The joint of claim 1 wherein the first annular resilient member is in a compressed state between the first annular retainer and the socket body, and the second annular resilient member is in a compressed state between the second annular retainer and the socket body.

3. The joint of claim 2 wherein the first and second annular resilient members are sufficiently compressed to allow 20° of movement in either direction from a centered state of the socket body about any axis of rotation substantially perpendicular to the longitudinal axis of the shaft without completely releasing the compressive force on either annular resilient member.

4. The joint of claim 3 wherein the first and second annular resilient members are sufficiently compressed to allow 30° of movement in either direction from a centered state of the socket body about the longitudinal axis of the shaft without completely releasing the compressive force on either annular resilient member.

5. The joint of claim 4 wherein the first annular resilient member is bonded to the first annular retainer and to the socket body, and the second annular resilient member is bonded to the second annular retainer and to the socket body.

6. The joint of claim 5 wherein the first annular retainer defines a retainer surface substantially perpendicular to the longitudinal axis of the shaft and to which said first annular resilient member is bonded, and wherein the second annular retainer defines a retainer surface substantially perpendicular to the longitudinal axis of the shaft, and to which said second annular resilient member is bonded.

7. The joint of claim 6 wherein the shaft and ball member define passage means for allowing introduction of lubricating fluid therethrough to the ball and socket surface portions.

8. The joint of claim 6 and further comprising a liner fixed to the substantially spherical concave surface portion defined by the socket body, and disposed between said substantially spherical concave surface portion and the substantially spherical convex surface portion of the ball member.

9. The joint of claim 1 wherein the socket body comprises first and second annular socket body portions which may be fitted together from opposite sides of the ball member to together define said socket body, the first annular resilient member being in continuous annular contact with the first annular socket body portion, and the second annular resilient member being in continuous annular contact with the second annular socket body portion.

10. The joint of claim 1 wherein the first annular resilient member is bonded to the first annular retainer and to the socket body, and the second annular resilient member is bonded to the second annular retainer and to the socket body.

* * * * *